United States Patent [19]
Hager et al.

[11] Patent Number: 5,636,848
[45] Date of Patent: *Jun. 10, 1997

[54] OIL SEAL FOR A HIGH SPEED ROTATING SHAFT

[75] Inventors: Jonathan S. Hager; Kellan P. Geck, both of Chandler; William L. Giesler; David M. Mathis, both of Phoenix, all of Ariz.

[73] Assignee: AlliedSignal Inc., Morris Township, Morris County, N.J.

[*] Notice: The term of this patent shall not extend beyond the expiration date of Pat. No. 5,538,258.

[21] Appl. No.: 412,629

[22] Filed: Mar. 29, 1995

Related U.S. Application Data

[63] Continuation-in-part of Ser. No. 391,847, Feb. 22, 1995, Pat. No. 5,538,258.

[51] Int. Cl.$^6$ ........................................ F16J 15/447
[52] U.S. Cl. ........................ 277/18; 277/57; 277/67; 277/68; 277/133
[58] Field of Search ........................ 277/13, 14 R, 277/18, 55, 56, 57, 134, 215, 84, 53, 67, 68, 133; 384/135, 478, 480

[56] References Cited

U.S. PATENT DOCUMENTS

| | | | |
|---|---|---|---|
| 897,189 | 8/1908 | Belluzzo | 277/56 |
| 1,394,959 | 10/1921 | Wilkinson | 277/56 |
| 1,779,076 | 10/1930 | Ray . | |
| 1,905,234 | 4/1933 | Labberton . | |
| 2,008,527 | 7/1935 | Warren | 277/56 |
| 2,202,944 | 6/1940 | Boyd . | |
| 2,524,124 | 10/1950 | Gyana . | |
| 2,598,381 | 5/1952 | Hoffman | 277/67 |
| 2,956,824 | 10/1960 | Kuchler et al. | 277/68 |
| 3,096,985 | 7/1963 | Biheller . | |
| 4,157,834 | 6/1979 | Burdette | 277/67 |
| 4,406,459 | 9/1983 | Davis et al. | 277/25 |
| 5,024,451 | 6/1991 | Borowski . | |
| 5,035,436 | 7/1991 | Rockwood et al. | 277/24 |
| 5,171,026 | 12/1992 | Starrick | 277/57 |
| 5,431,414 | 7/1995 | Fedorovich et al. . | |

FOREIGN PATENT DOCUMENTS

| | | | |
|---|---|---|---|
| 1321018 | 12/1963 | France . | |
| 493756 | 2/1930 | Germany | 277/57 |
| 1520283 | 11/1989 | Russian Federation | 277/53 |
| 24570 | 11/1904 | United Kingdom | 277/53 |
| 2035472 | 6/1980 | United Kingdom . | |

*Primary Examiner*—Scott Cummings
*Attorney, Agent, or Firm*—Jerry J. Holden; John R. Rafter

[57] ABSTRACT

An improved oil seal is provided for sealing passage of rotatable shaft through an end wall of a bearing housing in a turbomachine or the like, wherein the shaft is rotatably supported within the bearing housing by oil-lubricated bearings. The improved oil seal comprises a slinger rotor mounted on the shaft for rotation therewith. The slinger rotor has an inner surface with an annular cavity and axially extending lands separated from each other by axially extending slots. The cavity and slots define a low velocity zone in which oil is centrifuged out. The slots and cavity so the centrifuged oil flows away from the end wall of the bearing housing. A labyrinth, air seal is disposed between the shaft and end wall.

13 Claims, 1 Drawing Sheet

OIL SEAL FOR A HIGH SPEED ROTATING SHAFT

This patent application is a continuation-in-part of Ser. No. 08/391,847 filed Feb. 22, 1995 now U.S. Pat. No. 5,538,258. Both applications are assigned to the same assignee.

BACKGROUND OF THE INVENTION

This invention relates generally to improvements in oil seals and related seal systems for preventing oil leakage in connection with rotating shafts, and particularly in connection with relatively high speed rotating shafts in turbomachines and the like. More specifically, this invention relates to an improved oil seal utilizing principles of dynamic air-oil separation to seal passage of a rotatable shaft through an end wall of a bearing housing.

In turbomachinery, a rotatable shaft is commonly supported by appropriate journal and thrust bearings mounted within a bearing housing, wherein oil is circulated from a sump to lubricate the bearings. The rotatable shaft extends through an end wall of the bearing housing, at one or both ends thereof, for appropriate connection to other components of the turbomachine, such as a turbine wheel, compressor wheel, or other suitable shaft drive means or shaft load. Examples of such turbomachines includes turbochargers, turbocompressors, gas turbine engines, air turbine starter motors, and the like.

In general terms, it is highly desirable to minimize and eliminate oil leakage along the rotating shaft and through the end wall of the bearing housing. Alternately stated, it is desirable to confine circulatory oil flow to the interior of the bearing housing. In this regard, a wide variety of oil seal configurations have been proposed in efforts to overcome oil leakage problems. However, the high speed shaft rotation and other operating conditions in a typical turbomachine environment have generally precluded complete elimination of the oil leakage. That is, high speed shaft rotation tends to result in relatively rapid wear of seal structures and early onset of oil leakage. This problem is compounded by high temperature operating environments and adverse differential pressures which may be present on opposite sides of the bearing housing end wall.

There exists, therefore, a continuing need for further improvements in oil seal structures for use in turbomachines and the like, for substantially eliminating oil leakage through the end wall of a bearing housing, notwithstanding high speed shaft rotation and high temperature operating conditions. The present invention fulfills these needs and provides further related advantages.

SUMMARY OF THE INVENTION

In accordance with the invention, an improved oil seal is provided for substantially eliminating oil leakage along a rotatable shaft extending through a shaft passage formed in an end wall of a bearing housing in a turbomachine or the like. The improved oil seal includes a slinger rotor mounted within the bearing housing, at the inboard side of the end wall, in combination with dynamic air-oil separators for centrifugal pumping of oil away from the shaft passage. A labyrinth air seal is disposed in the shaft passage.

The slinger rotor is mounted onto the rotatable shaft as by press-fitting or the like for rotation therewith. The slinger rotor includes a radially outwardly extending slinger ring with a circumferential array of radially open slinger ports formed therein. A centrifuge sleeve projects axially from the slinger ring in a direction toward the adjacent end wall of the bearing housing. The centrifuge sleeve has an internal centrifuge surface disposed in close running clearance with an axially projecting cylindrical wall segment on the end wall, wherein this centrifuge surface is tapered with increasing diametric size in a direction toward the slinger ring. During shaft rotation, oil and air in the space between the centrifuge sleeve and the cylindrical end wall segment is pumped by centrifugal action in a direction away from the end wall, to the slinger ports for radial discharge to the interior of the bearing housing.

In accordance with a further aspect of a preferred form of the invention, the slinger rotor has an inner surface with an annular cavity and axially extending lands separated from each other by axially extending slots. The cavity and slots define a low velocity zone in which oil is centrifuged out. The slots and cavity are tapered so the centrifuged oil flows away from the end wall of the bearing housing.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
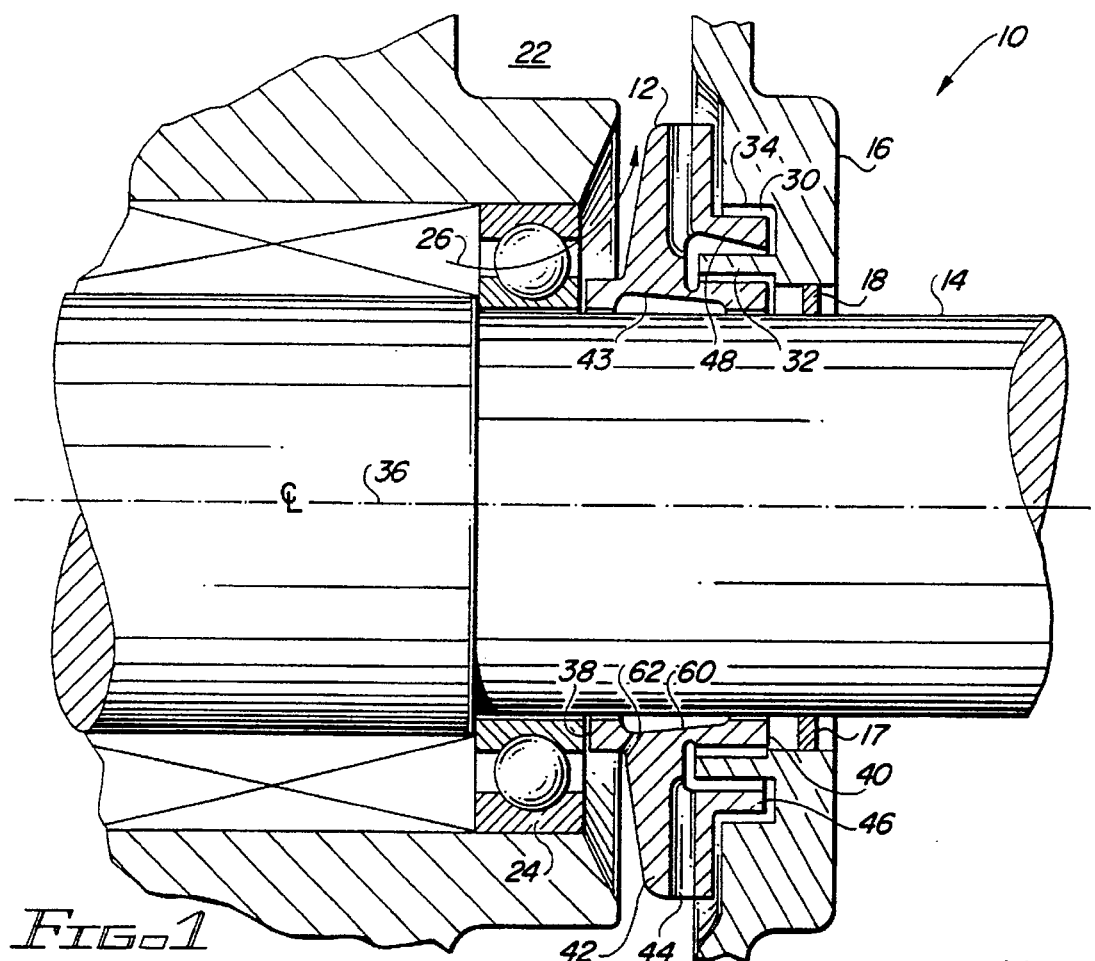
FIG. 1 is a fragmented vertical sectional view of a portion of a turbomachine, illustrating an improved oil seal to include a slinger rotor constructed in accordance with the novel features of the invention.

As shown in the exemplary drawings, an improved oil seal arrangement is provided for use in a turbomachine or the like identified generally in FIG. 1 by the reference numeral 10. The oil seal includes a slinger rotor 12, for sealing passage of a rotatable shaft 14 through an end wall 16 of a bearing housing for the turbomachine. The slinger rotor 12 is mounted on the shaft 14 for rotation therewith, and includes one or more dynamic air-oil separators for preventing oil from reaching a shaft passage 18 formed in the housing end wall 16. A knife edge, annular labyrinth air seal 17 is disposed in the passage 18 between the end wall 16 and shaft 14.

FIG. 1 generally shows the rotatable shaft 14 extending through the shaft passage 18 in the end wall 16 of the bearing housing, in a typical turbomachine application. In this regard, the end wall 16 cooperates with other elements of the bearing housing to define a substantially enclosed but typically vented space or volume 22 within which the shaft 14 is rotatably supported by appropriate journal and/or thrust bearings 24. An oil circulation system delivers lubricating oil along a flow path represented by arrow 26 to lubricate the bearings 24, wherein the oil flows through the bearings for drainage to a sump, not shown, within a lower region of the bearing housing. The slinger rotor 12 is mounted on the shaft 14 at the inboard side of the end wall 16, and functions to prevent any oil from reaching the shaft passage 18, thereby substantially eliminating undesired oil leakage. Although the slinger rotor 12 is shown at one end of the bearing housing for purposes of illustrating the invention, it will be understood that a similar oil seal arrangement may be provided in association with another shaft passage at an opposite end of the bearing housing. In this regard, the shaft 14 projects from the bearing housing for appropriate connection to other components of the turbomachine, such as a compressor wheel, turbine wheel, or other drive means or driven load.

To accommodate the seal arrangement of the present invention, as shown in FIG. 1, the end wall 16 of the bearing housing is shaped to define an annular channel 30 which opens in an inboard direction to the interior 22 of the bearing housing. The channel 30 is defined by an axially projecting cylindrical wall segment 32 which lines the shaft passage 18, and is disposed concentrically within an outer wall segment 34. The inner and outer wall segments 32, 34 are formed coaxial with a rotational axis 36 of the shaft 14.

The slinger rotor 12 has a generally cylindrical configuration with a size and shape for mounting as by press-fit installation onto the rotatable shaft 14. The slinger rotor 12 has an inboard axial end face 38 positioned adjacent to, and preferably abutted with an outboard bearing 24 which rotatably supports the shaft 14. An outboard end segment 40 of the slinger rotor 12 is formed with a relatively narrow radial dimension to fit with close running clearance within the inner wall segment 32 of the end wall 16.

A slinger ring 42 is formed on the slinger rotor 12 to extend radially outwardly within the housing interior 22, at a position proximate to the inboard face of the end wall 16. The slinger ring 42 has a circumferentially arranged plurality of radially open slinger ports 44 formed therein. Accordingly, during shaft rotation in the course of turbomachine operation, the slinger ring 42 and associated ports 44 function by centrifugal action to pump oil and air in a radially outward direction away from the shaft passage 18.

A centrifuge sleeve 46 is also provided as part of the slinger rotor 12 to project axially from the slinger ring 42 in a direction toward the end wall 16, to fit within the end wall channel 30. As shown, the centrifuge sleeve has an inner tapered centrifuge surface 48 positioned in relatively close running clearance with an outer cylindrical surface of the inner wall segment 32. The centrifuge surface 48 is tapered from a relatively small diametric size at the outboard end thereof to a larger diametric size at the radially inner extent of the slinger ports 44. In this regard, the slinger ports 44 are in open flow communication with the maximum diameter portion of the centrifuge surface 48.

In operation, during shaft rotation at typically high speed, any oil and air within the space between the centrifuge sleeve 46 and the inner wall segment 32 is driven or pumped toward the slinger ports 44. In effect, heavier oil is driven by centrifugal action against the centrifuge surface 48 and then axially away from the end wall 16 to the slinger ports 44. As noted previously, oil within the slinger ports 44 is centrifugally pumped for radially outward discharge into the interior 22 of the bearing housing 16, to drain ultimately to the sump.

The above-described centrifugal pumping action is desirably enhanced by surface finish characteristics of the centrifuge surface 48 and the surface extending radially outward therefrom between the slinger rotor 12 and end wall 16, in comparison with the surface finish on the inner wall segment 32. More particularly, the pumping action is substantially improved by forming the centrifuge surface 48 to be significantly rougher than the surface finish of the outer diameter side of the wall segment 32. With this comparatively rougher surface, the rotating centrifuge sleeve 46 tends to accelerate oil and air between the sleeve 46 and the adjacent wall segment 32 to a rotational speed substantially corresponding to shaft speed. The thus-accelerated oil and air is then subject to the dynamic air-oil separation, as previously described, with collected oil being ultimately discharged through the slinger ports 44 to the housing interior. Although the comparative surface finishes on the components may vary, a preferred ratio of surface finishes is on the order of about 4:1 or 5:1.

Figure 2:
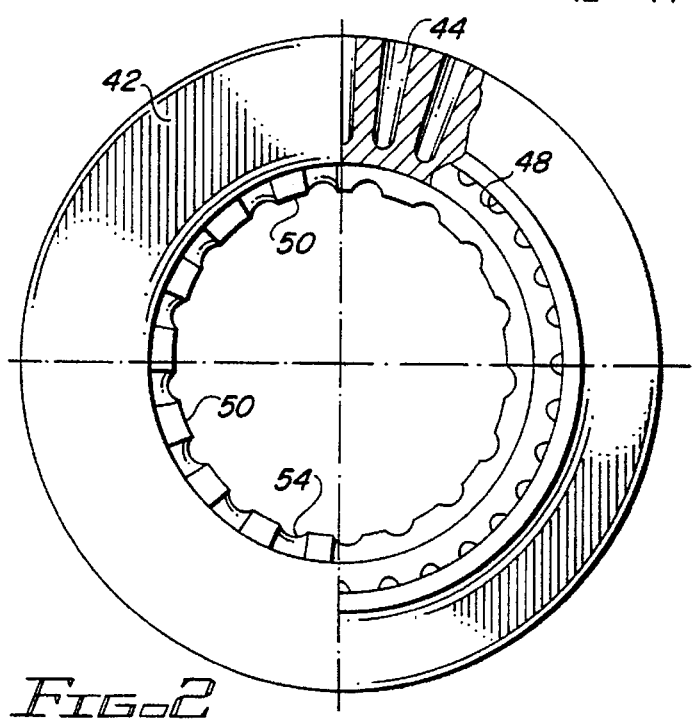
FIG. 2 is an inboard side elevation view of the slinger rotor shown in FIG. 1, with portions broken away to illustrate construction details thereof.
Figure 3:
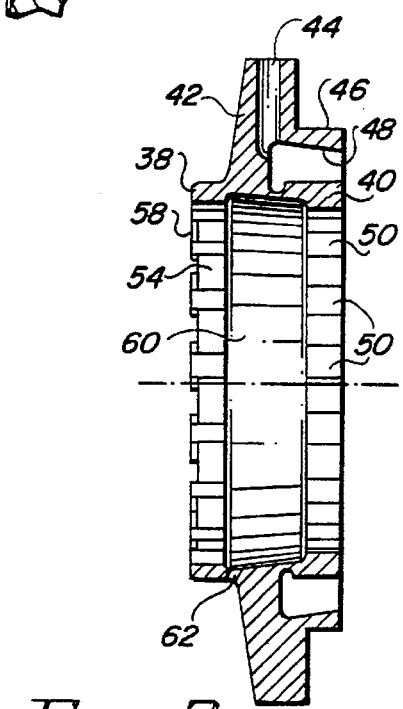
FIG. 3 is a vertical sectional view taken generally on the line 3—3 of FIG. 2.

In accordance with further aspects of the invention, an additional dynamic air-oil separator is desirably provided within the internal bore of the slinger ring 42. More specifically, as shown in FIGS. 2 and 3, an annular cavity 60 axially centered between the end face 38 and end segment 40 is formed in the inner surface 43 of the slinger ring 42. The cavity 60 is tapered with increasing diametric size as it extends from the end segment 40 to the end face 38. Preferably, the slope of this taper is between 4.5 and 6.5 degrees. At the point of maximum diametric size, three drain holes 62 through the slinger ring 42 place the cavity 60 in fluid communication with the housing interior 22. The holes 62 are preferably located 120 degrees apart. The cavity should be formed as deep as possible without affecting the structural integrity of the slinger ring 42. On the axial sides of the cavity 60 are a plurality of axially extending lands 50 formed on a radius for mounting as by press-fit installation onto the shaft 14. These lands 50 are separated from one another by axially extending ramped slots 54 which define additional centrifuge surfaces tapering with increasing diametric size in a direction away from the end wall 16. At the inboard end face 38 of the slinger rotor 12, the ramped slots 54 communicate with radially outwardly open notches 58 formed in said end face 38.

In operation, the cavity 60 creates a low velocity zone where oil can be centrifuged out from the air. The separated oil collects on the tapered surface of the bore and flows down to the drain holes 62. Similarly, oil is centrifuged out within the ramped slots 54. Such oil in the slots 54 located on the outboard side of the cavity 60 flow into the cavity 60 and is expelled with the oil in the cavity. Oil centrifuged out in the slots 54 located inboard of the cavity 60 flows to the radially open notches 58. These notches 58 act in a manner similar to the slinger ports 44 for radially pumping and discharging the collected oil to the interior 22 of the bearing housing.

The improved slinger rotor 12 of the present invention thus provides at least one and preferably multiple dynamic air-oil separator structures for centrifugal pumping of oil so as to keep the oil away from the shaft passage 18 in the end wall 16 of the bearing housing. Importantly, this centrifugal pumping action effectively eliminates oil leakage through the shaft passage, without requiring any substantial or direct running mechanical contact between rotating and stationary components. The improved seal structure is thus capable of preventing oil leakage over a prolonged operating life, at high shaft speeds, and in response to high temperature operating environments.

A variety of further modifications and improvements to the invention described herein will be apparent to those skilled in the art. Accordingly, no limitation on the invention is intended by way of the foregoing description and accompanying drawings, except as set forth in the appended claims.

What is claimed is:

1. An oil seal for sealing passage of a rotatable shaft through a shaft passage formed in an end wall of a bearing housing, said oil seal comprising:

a generally cylindrical wall segment formed on the end wall in a position lining the shaft passage and projecting from the end wall in an axial inboard direction into the bearing housing, said cylindrical wall segment having an inner wall segment on the end wall that cooperates with an outer generally cylindrical wall segment on the end wall to define an annular channel; and a slinger rotor mounted on said shaft for rotation therewith, said slinger rotor including a slinger ring with a plurality of radially open slinger ports formed therein;

said slinger rotor further including a centrifuge sleeve extending axially from said slinger ring in an outboard direction and projecting axially into said annular channel, said centrifuge sleeve defining an internal centrifuge surface disposed in relatively close running clearance with said cylindrical wall segment and having a diametric size which tapers with increasing diameter in an inboard direction, said centrifuge surface having an inboard end in flow communication with radially inner ends of said slinger ports, whereby oil within the space between said centrifuge sleeve and said cylindrical wall segment is pumped by centrifuge action during shaft rotation along said centrifuge surface in a direction away from the end wall to said slinger ports; and an air seal disposed in said shaft passage.

2. The oil seal of claim 1 wherein said slinger rotor has a bore formed therein for press-fit mounting of said slinger rotor onto the shaft.

3. The oil seal of claim 1 wherein said centrifuge surface of said slinger rotor has a surface finish which is comparatively rougher than a surface finish of said cylindrical wall segment.

4. The oil seal of claim 1 wherein said slinger rotor has a bore formed therein and defined by a plurality of axially extending lands separated from each other by axially extending ramped slots having a diametric size which tapers with increasing diameter in an inboard direction, said lands being sized for press-fit mounting of said slinger rotor onto the shaft, and said ramped slots being for pumping oil within the space between adjacent lands by centrifuge action during shaft rotation in a direction away from the end wall.

5. The oil seal of claim 4 wherein said slinger rotor defines an inboard end having a plurality of radially open notches formed therein and positioned respectively in flow communication with said ramped slots.

6. An oil seal for sealing passage of a rotatable shaft through a shaft passage formed in an end wall of a bearing housing, said oil seal comprising:

a generally cylindrical wall segment formed on the end wall in a position lining the shaft passage and projecting from the end wall in an axial inboard direction into the bearing housing, said cylindrical wall segment having an inner wall segment on the end wall that cooperates with an outer generally cylindrical wall segment on the end wall to define an annular channel; and a slinger rotor mounted on said shaft for rotation therewith, said slinger rotor including a slinger ring with a plurality of radially open slinger ports formed therein;

said slinger rotor further including a centrifuge sleeve extending axially from said slinger ring in an outboard direction and projecting axially into said annular channel, said centrifuge sleeve defining an integral centrifuge surface disposed in relatively close running clearance with said cylindrical wall segment and having a diametric size which tapers with increasing diameter in an inboard direction, said centrifuge surface having an inboard end in flow communication with radially inner ends of said slinger ports, whereby oil within the space between said centrifuge sleeve and said cylindrical wall segment is pumped by centrifuge action during shaft rotation along said centrifuge surface in a direction away from the end wall to said slinger ports; and said slinger ring having an inner surface with an annular cavity.

7. The oil seal of claim 6 wherein said cavity is tapered with increasing diametric size as it extends in an inboard direction.

8. The oil seal of claim 7 wherein said cavity is tapered at a slope of about 4.5 to 6.5 degrees.

9. The oil seal of claim 8 Wherein said slinger rings has at least one drain hole for said cavity.

10. The oil seal of claim 6 further comprising on at least one axial side of said cavity a plurality of axially extending lands separated from each other by axially extending ramped slots having a diametric size which tapers with increasing diameter in an inboard direction, said lands being sized for press-fit mounting of said slinger ring onto the shaft.

11. The oil seal of claim 10 wherein said slinger ring defines an inboard end having a plurality of radially open notches formed therein and positioned respectively in flow communication with those ramped slots on the inboard side of said cavity.

12. The oil seal of claim 11 wherein said centrifuge surface of said slinger rotor has a surface finish which is comparatively rougher than a surface finish of said cylindrical wall segment.

13. The oil seal of claim 6 further comprising an air seal disposed in said shaft passage.

* * * * *